United States Patent
Liu et al.

(10) Patent No.: US 12,238,207 B2
(45) Date of Patent: Feb. 25, 2025

(54) SECURE PROCESSOR FOR POST-QUANTUM CRYPTOGRAPHY ALGORITHM CRYSTALS-KYBER

(71) Applicant: Wuhan Yixin Microelectronics Co., Ltd., Wuhan (CN)

(72) Inventors: Dongsheng Liu, Wuhan (CN); Ang Hu, Wuhan (CN); Tianze Huang, Wuhan (CN); Siqi Xiong, Wuhan (CN); Chenjun Yang, Wuhan (CN); Jiaming Zhang, Wuhan (CN)

(73) Assignee: Wuhan Yixin Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 18/295,274

(22) Filed: Apr. 4, 2023

(65) Prior Publication Data
US 2024/0146517 A1     May 2, 2024

(30) Foreign Application Priority Data

Nov. 2, 2022    (CN) .................. 202211363055.X (51) Int. Cl.
*H04L 9/08*         (2006.01)
*H04L 9/32*         (2006.01)

(52) U.S. Cl.
CPC .......... *H04L 9/0852* (2013.01); *H04L 9/3242* (2013.01)

(58) Field of Classification Search
None
See application file for complete search history.

(56) References Cited

U.S. PATENT DOCUMENTS

| 11,374,975 | B2 | 6/2022 | Gray et al. |
| 11,416,638 | B2 | 8/2022 | Banerjee et al. |
| 11,496,297 | B1* | 11/2022 | Beckwith .............. H04L 9/3093 |
| 2021/0377049 | A1* | 12/2021 | Nix ........................ H04L 9/0877 |
| 2022/0173915 | A1* | 6/2022 | Gray ..................... H04L 9/0852 |

FOREIGN PATENT DOCUMENTS

CN             114640454 A     6/2022

\* cited by examiner

*Primary Examiner* — William J. Goodchild
(74) *Attorney, Agent, or Firm* — True Shepherd LLC; Andrew C. Cheng (57) ABSTRACT

A secure processor for a post-quantum cryptography (PQC) algorithm CRYSTALS-KYBER, includes a communication unit, a management unit, a processing unit, and a storage unit. The communication unit is configured to receive and transmit data for the secure processor; the management unit is configured to control the processing unit according to the data; the processing unit is configured to process the data to form encrypted data, decrypted data and key data; and the storage unit is configured to store all data. The secure processor can efficiently and rapidly realize key generation, encryption and decryption of a KYBER algorithm under KYBER1024, KYBER768 and KYBER512 security levels, makes data encryption more complicated, and ensures security of the data.

7 Claims, 8 Drawing Sheets

SECURE PROCESSOR FOR POST-QUANTUM CRYPTOGRAPHY ALGORITHM CRYSTALS-KYBER

CROSS-REFERENCE TO RELATED APPLICATIONS

This application claims priority to Chinese Patent Application No. 202211363055.X with a filing date of Dec. 2, 2022. The content of the aforementioned applications, including any intervening amendments thereto, is incorporated herein by reference.

TECHNICAL FIELD

The present disclosure relates to the fields of post-quantum cryptography (PQC) algorithms, information security, cryptographic processors, and hardware circuit design and implementation, and in particular to a secure processor for a PQC algorithm CRYSTALS-KYBER.

BACKGROUND

In order to cope with security threats for conventional public-key cryptosystems in rapid development of quantum computing, PQC that makes existing encryption quantum-secure is becoming a research hotspot in the fields of international cryptological theories and technologies. As a cryptography scheme based on hardness of solving problems over lattices, CRYSTALS-KYBER (hereinafter referred to as KYBER) achieves a better tradeoff among security, sizes of public and private keys, and the computing speed. According to the announcement by the National Institute of Standards and Technology (NIST) on Jul. 5, 2022, CRYSTALS-KYBER, FALCON, CRYSTALS-Dilithium and SPHINCS+ are selected as standardization algorithms in the PQC project ahead of time. This milestone event indicates that the CRYSTALS-KYBER becomes one of the first PQC standardization algorithms.

The CRYSTALS-KYBER is deemed as a lattice-based cryptography scheme depending on hardness of module learning with errors (M-LWE) problems, and one of the latest lattice-based encryption schemes at present. It has received widespread attention from researchers in home and abroad for advantages such high efficiency, high security, and high flexibility. There have been various optimization schemes proposed for this algorithm. However, present research of the international academic community on the KYBER algorithm mainly focuses on optimization of theories, and hardware implementation of key modules and key operators. For example, the hash module and the sampler, as crucial structures of key operators for generating coefficients, polynomial multipliers, and key operators in the fast number theoretic transform (NTT) are time-consuming and resource-consuming in hardware computation. For these key operators and modules, different hardware implementation schemes are proposed to yield better performance and less computing time.

In terms of application, KYBER algorithm supports diverse application scenarios such as cloud computing, data centers, Internet of Things (IoT) and fully homomorphic encryption. In the cloud computing, a comprehensive, multilevel and multidimensional security assurance system around the KYBER algorithm can be formed. By embedding a KYBER secure processor into various high-performance cloud computing service platforms, integrated fusion on application, security and cipher is realized. In the data center management system, for huge encryption key management of multiple cloud platforms, the KYBER secure processor can protect storage against potential threats from quantum computers. In the IoT, the KYBER processor can protect interaction and connection between a cloud terminal, a management terminal and a device terminal, and make identities, data and communication channels secure in data transmission. The specific application scenarios encompass identity authentication in the Internet of Vehicles (IoV), data protection of implantable medical devices, etc. A fully homomorphic encryption scheme can be constructed based on the KYBER algorithm to resist attacks from quantum computers, and has a broad application prospect in outsourced computing, privacy-preserving machine learning, secure multi-party computation, data exchange, etc.

SUMMARY OF PRESENT INVENTION

Since the existing CRYSTALS-KYBER secure processor has a slow running speed and cannot obtain desired data efficiently and rapidly, a technical problem to be solved by the present disclosure is to provide a secure processor for a PQC algorithm CRYSTALS-KYBER with high efficiency, rapidity and high security.

To solve the above-mentioned technical problem, an embodiment of the present disclosure provides a secure processor for a PQC algorithm CRYSTALS-KYBER, including a communication unit, a management unit, a processing unit, and a storage unit;

the communication unit is configured to receive and transmit data for the secure processor;

the management unit is configured to control the processing unit according to the data;

the processing unit is configured to process the data to form encrypted data, decrypted data and key data; the processing unit includes a fast NTT module, a hash module, and a configurable sampling module; the hash module and the configurable sampling module are configured to process the data into polynomial data; and the NTT module is configured to accelerate an operation in data processing; and the storage unit is configured to store all data.

Preferably, the communication unit uses a standard serial peripheral interface (SPI).

Preferably, the management unit includes a key management module and an address generation module;

the key management module is configured to transmit an instruction to the processing unit; and the address generation module is configured to provide an address to the processing unit for executing an operation.

Preferably, the fast NTT module includes at least one multiplexing butterfly unit.

Preferably, the multiplexing butterfly unit includes two modulo adders, two modulo subtractors, and a fast modulo multiplier; and the multiplexing butterfly unit may function as both a Cooley-Tukey (CT) butterfly unit and a Gentleman-Sande (GS) butterfly unit.

Preferably, the fast modulo multiplier includes a plurality of multipliers, a plurality of subtractors, and a plurality of registers; and the registers are arranged in a pipelined form.

Preferably, the hash module includes a controller, an input buffer, a round function module, and an output buffer; the round function module includes two identical converters connected in serials.

Preferably, the output buffer includes a 1,344-bit buffer register to separate output data from incompletely processed data.

Preferably, the configurable sampling module includes a rejection sampler and a binomial distribution sampler; the rejection sampler may support parallel input of four 48-bit data; and the binomial distribution sampler may support parallel input of sixteen 8-bit data.

Preferably, the storage unit includes at least one dual-port memory.

The embodiment of the present disclosure has the following beneficial effects:

(1) Under the control of a management unit, and with the cooperation among a fast NTT module, a hash module and a configurable sampling module in a processing unit, the secure processor for the PQC algorithm CRYSTALS-KYBER processes data rapidly and conveniently, and ensures security of ciphers.

(2) The fast NTT module includes at least one multiplexing butterfly unit. The multiplexing butterfly unit can function as both a CT butterfly unit and a GS butterfly unit. Therefore, the present disclosure realizes the accelerated operation and complicated processing of the data, and improves the operating speed and security of the data.

(3) The fast modulo multiplier includes a plurality of multipliers, a plurality of subtractors, and a plurality of registers. The registers are arranged in a pipelined form. The fast modulo multiplier performs multiple times of multiplication, multiple times of repeated subtraction and one time of comparison when running at a time, thereby realizing high-performance modulo multiplication. The registers arranged in the pipelined form can realize maximum throughput and resource utilization on the data.

(4) The round function module in the hash module includes two identical converters connected in serials. Hence, the time for realizing one round of pseudo-random number iteration is shortened from 24 cycles to 12 cycles, and the speed is doubled. Meanwhile, the hash module includes a 1,344-bit buffer register to separate the processing from the transmission, such that the overall efficiency is doubled.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Figure 1:
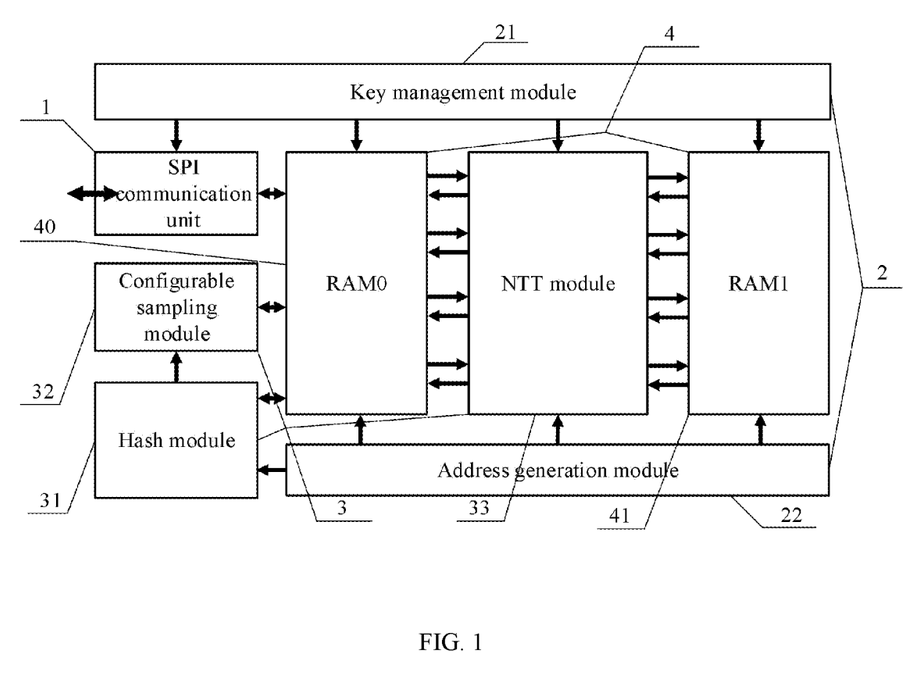
FIG. 1 is a structural schematic diagram according to a first embodiment of the present disclosure.
Figure 2:
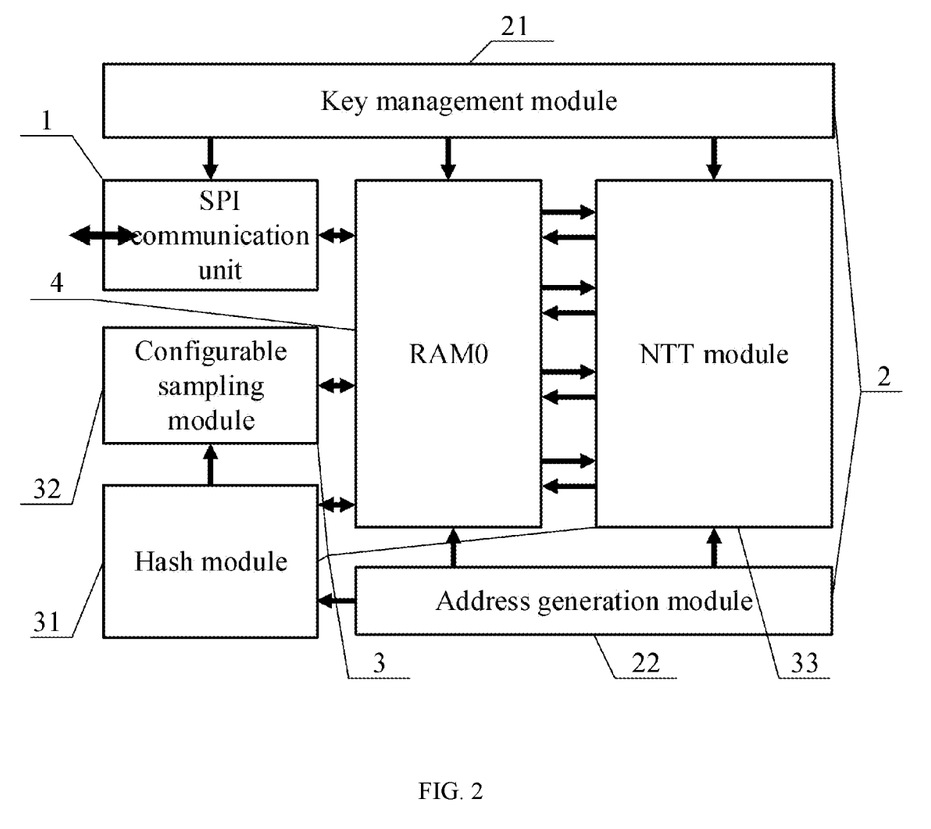
FIG. 2 is a structural schematic diagram according to a second embodiment of the present disclosure.

Referring to FIG. 1, an embodiment discloses a secure processor for a PQC algorithm CRYSTALS-KYBER (hereinafter referred to as a KYBER secure processor). The KYBER secure processor includes a communication unit 1, a management unit 2, a processing unit 3, and a storage unit 4. The communication unit 1 uses a standard SPI, and is configured to implement bidirectional transmission of data between the KYBER secure processor and peripherals. The management unit 2 includes a key management module 21 and an address generation module 22, and is configured to control the processing unit according to the data. The key management module 21 is configured to transmit an instruction to the processing unit. The address generation module is configured to provide an address for executing an operation. The processing unit 3 includes a fast NTT module 33, a configurable sampling module 32, and a hash module 31, and is configured to process the data to form encrypted data, decrypted data and key data. The hash module 31 and the configurable sampling module 32 are configured to process the data into polynomial data. The fast NTT module 33 is configured to accelerate an operation of the polynomial data into terminal data. The storage unit 4 includes a dual-port memory 40 (RAM0) and a dual-port memory 41 (RAM1), and is configured to store all data. Referring to FIG. 2, the present disclosure further provides another embodiment. The storage unit 4 includes only one dual-port memory.

Both the first embodiment and the second embodiment can support key generation, encryption and decryption of a KYBER algorithm under KYBER1024, KYBER768 and KYBER512 security levels. In the first embodiment and the second embodiment, required data is received by the communication unit 1, and stored to the storage unit 4. The address generation unit 22 in the management unit 2 provides an address of data required by the processing unit 3 and stored in the storage unit 4. The key management module 21 transmits a signal to the processing unit 3. The hash module 31 in the processing unit 3 acquires the data from the storage unit 4, processes the data, and transmits processed data to the configurable sampling module 32 to generate polynomial data. The fast NTT module 33 accelerates the operation to generate final data. The final data is transmitted by the communication unit 1.

Figure 3:
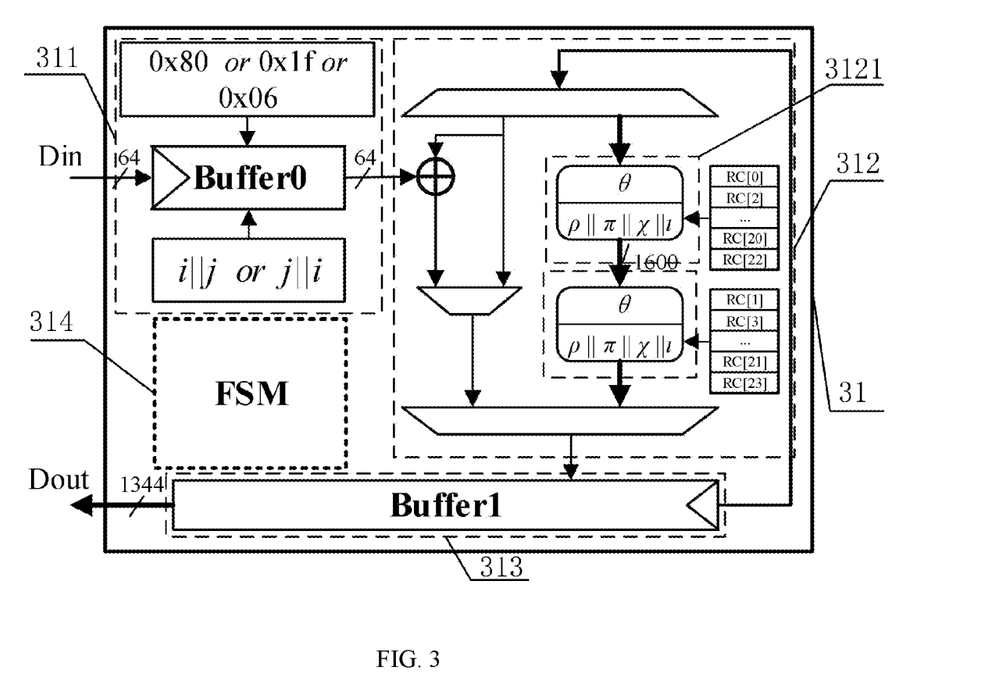
FIG. 3 is a schematic structural diagram of a hash unit in FIG. 1 and FIG. 2.

Referring to FIG. 3, the hash module 31 includes a controller 314, an input buffer 311 (Buffer0), a round function module 312, and an output buffer 313 (Buffer1). The controller 314 is configured to control the hash module. The input buffer 311 is configured to pad a tail sequence of data. The round function module 312 is configured to process the data in SHA3-256, SHA3-512, SHAKE-128, SHAKE-256 and SHAKE-256(s‖b). The output buffer 313 is configured to register processing data and processed data. When the hash module 31 works, data (Din) is transmitted to the hash module 31. The controller 314 transmits a signal to the input buffer 311, the round function module 312 and the output buffer 313. The data is transmitted to the input buffer 311 to pad a tail sequence. Since the random number in the input buffer 311 is input from the outside, the hash module 31 is more flexible. Padded data is transmitted to the round function module 312. The round function module 312 includes two identical converters 3121. The two converters 3121 are connected in serials. The converters 3121 each include five steps. The time for one round of pseudo-random number iteration is shortened from 24 cycles to 12 cycles, and the speed is doubled. Data processed by the round function module 312 is transmitted to the output buffer 313. The output buffer 313 includes a 1,344-bit buffer register to separate the processing from the transmission, such that the overall efficiency is doubled. Processed data (Dout) is transmitted to the configurable sampling module 32.

Figure 4:
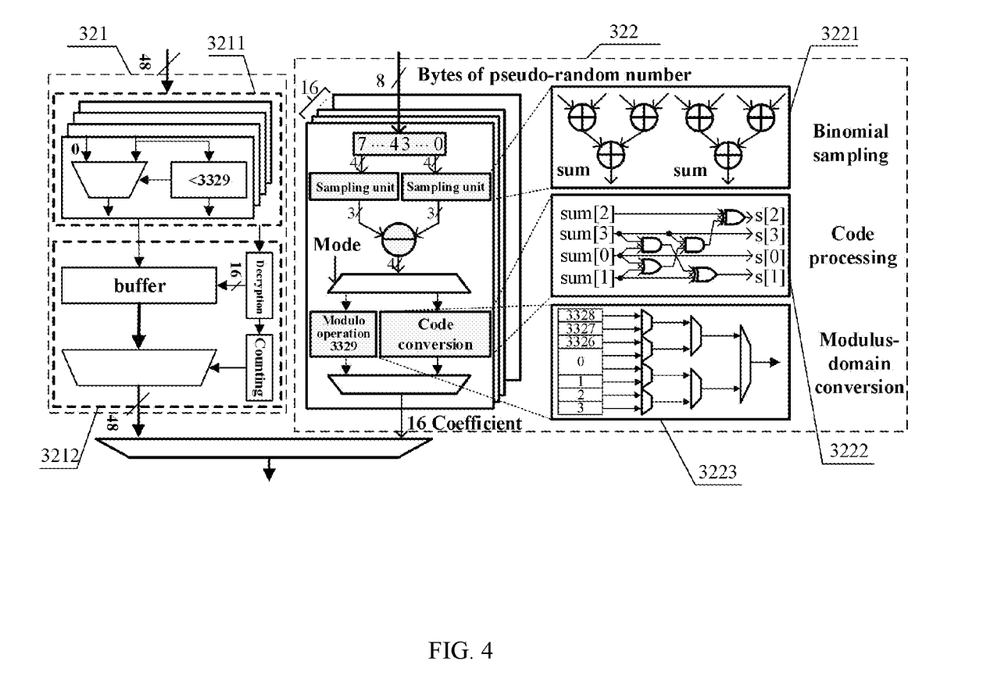
FIG. 4 is a schematic structural diagram of a configurable sampling unit in FIG. 1 and FIG. 2.

Referring to FIG. 4, the configurable sampling module 32 includes a rejection sampler 321 and a secondary sampler 322. The rejection sampler 321 includes a rejection sampling unit 3211 and a decryption unit 3212. The secondary sampler 322 includes a secondary sampling unit 3221, a code processing unit 3222 (for code conversion), and a modulus-domain conversion unit (3223) (a modulo operation unit 3329). The rejection sampler 321 supports parallel input of four data. The bit width in single input is 48 bits. Data less than that in 3329 is sampled. A binomial distribution sampling module in the double sampler 322 supports parallel input of sixteen 8-bit data. In transmission from the hash module 31 to the configurable sampling module 32, the rejection sampling unit 3211 in the rejection sampler 321 compares the data, and samples the data less than that in 3329. The rejection sampling unit 3211 transmits sampled data to the decryption unit 3212. The decryption unit 3212 decrypts the data, while the counting unit rearranges the data to obtain a sequential output result. The output bit width is 48 bits. Unsampled data in the rejection sampling unit 3211 is transmitted to the secondary sampler 322. The secondary sampling unit 3221 in the secondary sampler 322 calculates a Hamming distance of the data, and transmits the data to the code processing unit 3222 for code conversion or to the modulus-domain conversion unit 3223 for modulo operation according to requirements of a mode. At last, final processed data in the rejection sampler 321 or in the secondary sampler 322 is transmitted to the outside through the communication unit 1.

Figure 5:
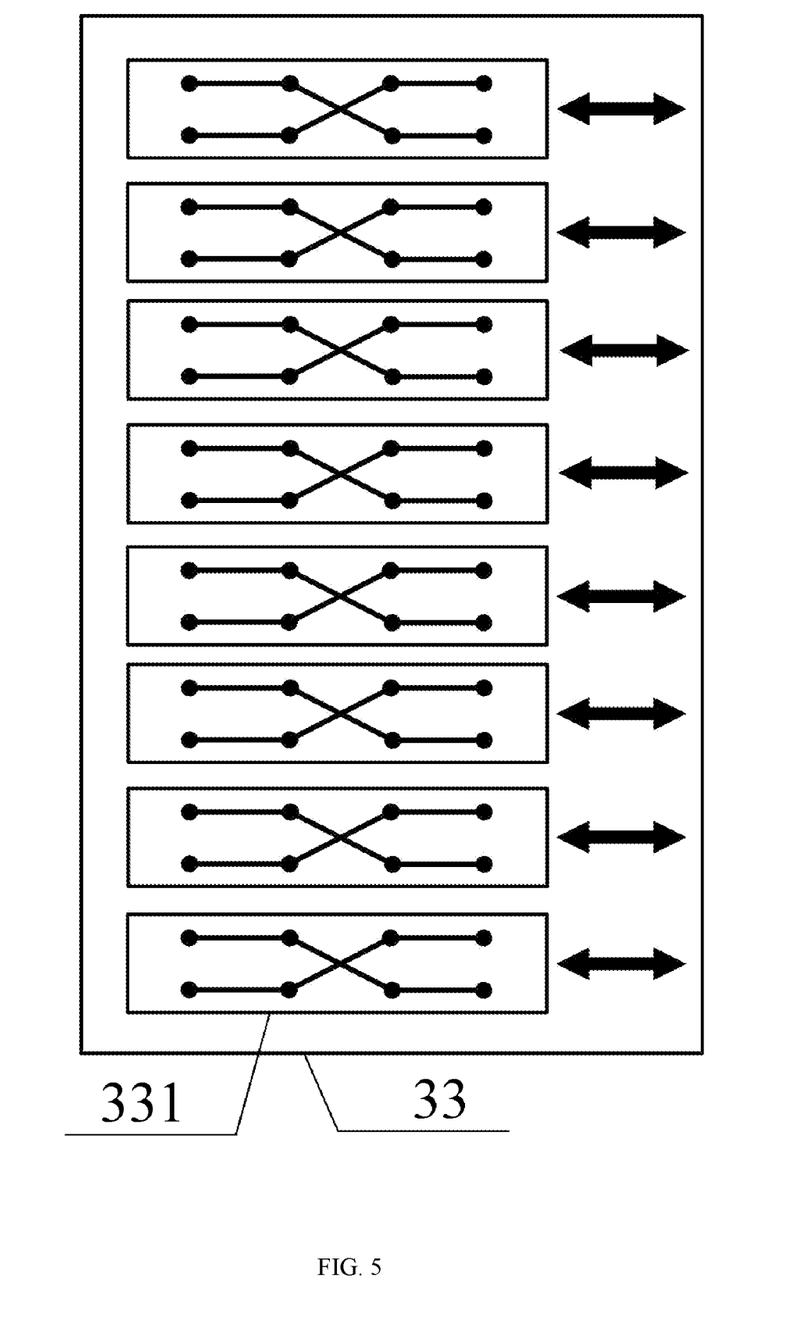
FIG. 5 is a first schematic structural diagram of a fast NTT module in FIG. 1 and FIG. 2.
Figure 6:
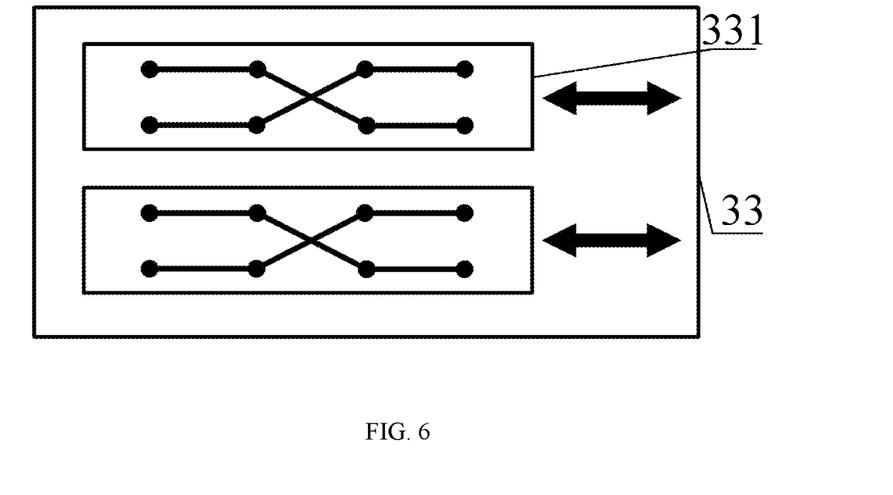
FIG. 6 is a second schematic structural diagram of a fast NTT module in FIG. 1 and FIG. 2.
Figure 7:
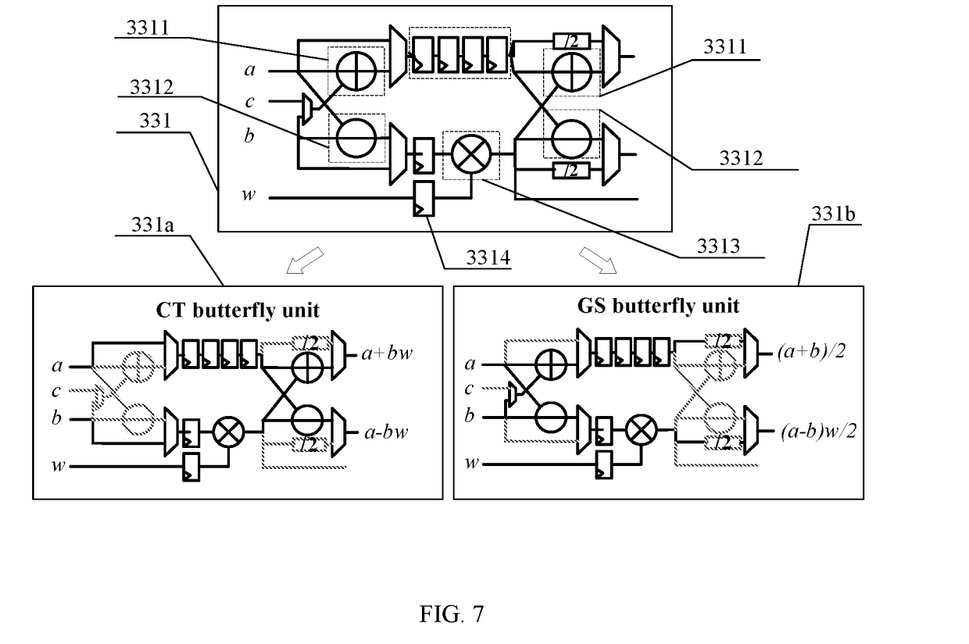
FIG. 7 is a schematic structural diagram of a multiplexing butterfly unit in FIG. 5 and FIG. 6.

Referring to FIG. 5, the KYBER secure processor further includes the fast NTT module 33 configured to accelerate an operation in the hash module 31 and the configurable sampling module 32. The fast NTT module 33 includes eight multiplexing butterfly units 331. Referring to FIG. 7, the multiplexing butterfly units 331 each include two modulo adders 3311, two modulo subtractors 3312, and a fast modulo multiplier 3313. The multiplexing butterfly unit 331 can convert into a CT butterfly unit 331a or a GS butterfly unit 331b. Polynomial data in NTT computation may be subjected to NTT operations of eight multiplexing butterfly units 331, including forward NTT (NTT computation) and inverse NTT (INTT computation). In the forward NTT, the NTT module 33 may be configured as an eight-channel CT-NTT structure (composed of the CT butterfly unit 331a) to realize a computing process in the NTT. In the inverse NTT, the NTT module 33 may be configured as a GS-INTT structure (composed of the GS butterfly unit 331b). The structure still includes the eight-channel multiplexing butterfly unit 331. The two structures may be configured by the NTT module 33, and applied to different operation requirements. The NTT module 33 composed of a plurality of the multiplexing butterfly units 331 may also execute the forward NTT or the inverse NTT in the KYBER secure processor in a single mode. That is, the forward NTT and the inverse NTT may be executed in the CT-NTT structure, and may also be executed in the GS-NTT structure. Referring to FIG. 6, the present disclosure further provides the fast NTT module 33 of another structure. The fast NTT module 33 includes two multiplexing butterfly units 331. In the present disclosure, the NTT module may be specifically realized by different implementations.

Referring to FIG. 7, the multiplexing butterfly units 331 each include two modulo adders 3311, two modulo subtractors 3312, and a fast modulo multiplier 3313. The multiplexing butterfly unit 331 can convert into a CT butterfly unit 331a or a GS butterfly unit 331b. In the CT butterfly unit 331a, data b and data w enter the fast modulo multiplier 3313 through a one-stage delay chain 3314 for modulo multiplication, thereby obtaining data b*w. After passing through a four-stage delay chain 3314, data a enters the modulo adder 3311 and the modulo subtractor 3312 together with the data b*w for a butterfly operation, thereby obtaining data a+bw and data a−bw. The modulo adder 3311 outputs the data a+bw. The modulo subtractor 3312 outputs the data a−bw. In the GS butterfly unit 331b, data a and data b enter the modulo adders 3311 and the modulo subtractors 3312 for a butterfly operation, thereby obtaining data a+b and data a−b. The modulo adder outputs the data a+b. The modulo subtractor outputs the data a−b. The data a−b and data w are transmitted to the fast modulo multiplier 3313 through the one-stage delay chain 3314 for modulo multiplication, and divided by 2 to obtain final data (a−b)w/2. The data a+b passes through the four-stage delay chain 3314 and then is divided by 2 to obtain final data (a+b)/2.

Figure 8:
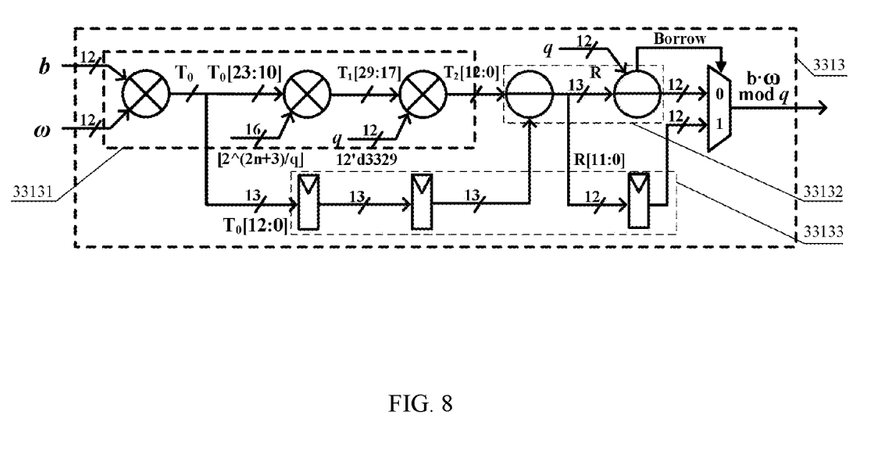
FIG. 8 is a schematic structural diagram of a fast modulo multiplier in FIG. 7.

Referring to FIG. 8, the fast modulo multiplier 3313 includes a multiplier set 33131, a subtractor set 33132, and a register set 33133. The multiplier set 33131 includes three multipliers. The subtractor set 33132 includes two subtractors. The register set 33133 includes a plurality of registers. The registers are arranged in a pipelined form to realize maximum throughput and resource utilization. In the operation, data b and data w enter a first multiplier in the multiplier set 33131 to obtain data T0. Ten low-order bits in the data T0 are truncated to output T0[23:10]. This data enters a second multiplier in the multiplier set 33131 with constant data, in which a constant has a bit width m=16, thereby obtaining data T1. By same reasoning, the multiplication is performed for three times to obtain data T2. The data T2 enters the subtractor set 33132 together with data T0 in the register set 33133 for two times of subtraction. If a carry signal is borrowed to 1 for data overflow, a registered data signal is output to accelerate the operation. There are three times of multiplication, two times of subtraction, and one time of comparison in the whole process, thereby realizing high performance of modulo multiplication.

The above disclosed is only preferred embodiments of the present disclosure, and definitely should not be used to limit the scope of the claims of the present disclosure. A person of ordinary skill in the art can understand all or some of the procedures for implementing the foregoing embodiments and make equivalent changes according to the claims of the present disclosure. The equivalent changes still fall within the scope of the present disclosure.

What is claimed is:

1. A secure processor for a post-quantum cryptography (PQC) algorithm CRYSTALS-KYBER, comprising a communication unit, a management unit, a processing unit, and a storage unit, wherein
   the communication unit is configured to receive and transmit data for the secure processor;
   the management unit is configured to control the processing unit according to the data;
   the processing unit is configured to process the data to form encrypted data, decrypted data and key data; the processing unit comprises a fast number theoretic transform (NTT) module, a hash module, and a configurable sampling module; the hash module and the configurable sampling module are configured to process the data into polynomial data; and the NTT module is configured to accelerate an operation in data processing; and
   the storage unit is configured to store the data;
   the hash module comprises a controller, an input buffer, a round function module, and an output buffer; the input buffer is configured to pad a tail sequence of data; the round function module comprises two identical converters connected in series; the round function module is configured to process the data in SHA3-256, SHA3-512, SHAKE-128, SHAKE-256 and SHAKE-256 (s||b); the output buffer 313 is configured to register processing data and processed data; The output buffer includes a 1,344-bit buffer register to separate the processing from the transmission;
   the configurable sampling module comprises a rejection sampler and a binomial distribution sampler; the rejection sampler supports parallel input of four 48-bit data; and the binomial distribution sampler supports parallel input of sixteen 8-bit data; the rejection sampler includes a rejection sampling unit and a decryption unit; the secondary sampler includes a secondary sampling unit, a code processing unit, and a modulus-domain conversion unit; the rejection sampling unit compares the data, and samples the data less than 3329; the decryption unit decrypts the data less than 3329, and a counting unit rearranges the data to obtain a sequential output result; unsampled data in the rejection sampling unit is transmitted to the secondary sampler; the secondary sampling unit calculates a Hamming distance of the unsampled data, and transmits the unsampled data to the code processing unit for code conversion or to the modulus-domain conversion unit for modulo operation according to requirements of a mode.

2. The secure processor according to claim 1, wherein the communication unit uses a standard serial peripheral interface (SPI).

3. The secure processor according to claim 1, wherein the management unit comprises a key management module and an address generation module;
   the key management module is configured to transmit an instruction to the processing unit; and
   the address generation module is configured to provide an address to the processing unit for executing an operation.

4. The secure processor according to claim 1, wherein the fast NTT module comprises at least one multiplexing butterfly unit.

5. The secure processor according to claim 4, wherein the multiplexing butterfly unit comprises two modulo adders, two modulo subtractors, and a fast modulo multiplier; and the multiplexing butterfly unit is capable of functioning as both a Cooley-Tukey (CT) butterfly unit and a Gentleman-Sande (GS) butterfly unit.

6. The secure processor according to claim 5, wherein the fast modulo multiplier comprises a plurality of multipliers, a plurality of subtractors, and a plurality of registers; and the registers are arranged in a pipelined form.

7. The secure processor according to claim 1, wherein the storage unit comprises at least one dual-port memory.

* * * * *